United States Patent [19]

Inaba et al.

[11] Patent Number: 4,906,173
[45] Date of Patent: Mar. 6, 1990

[54] COMPRESSOR UNIT IN AN INJECTION-COMPRESSION MOLDING MACHINE

[75] Inventors: Yoshiharu Inaba, Kawasaki; Hideo Naito, Hino; Kikuo Watanabe, Yamanashi; Masayuki Iwatsuki, Sagamihara, all of Japan

[73] Assignee: Fanuc Ltd., Minaitsuru, Japan

[21] Appl. No.: 360,902

[22] PCT Filed: Sep. 28, 1988

[86] PCT No.: PCT/JP88/00990
§ 371 Date: Apr. 18, 1989
§ 102(e) Date: Apr. 18, 1989

[87] PCT Pub. No.: WO89/03757
PCT Pub. Date: May 5, 1989

[30] Foreign Application Priority Data
Oct. 24, 1987 [JP] Japan .................. 62-267627

[51] Int. Cl.[4] .......................................... B29C 45/66
[52] U.S. Cl. ........................ 425/589; 425/450.1; 425/451.4
[58] Field of Search ........... 425/149, 150, 589, 450.1, 425/451.4

[56] References Cited

U.S. PATENT DOCUMENTS 3,156,014  11/1964  Wenger .......................... 425/589
4,696,632  9/1987   Inaba ............................. 425/150

FOREIGN PATENT DOCUMENTS 9034      1/1984   Japan .
187826    10/1984  Japan .
106221    5/1986   Japan .

Primary Examiner—Jay H. Woo
Assistant Examiner—Timothy W. Heitbrink
Attorney, Agent, or Firm—Staas & Halsey

[57] ABSTRACT

A compressor unit of an injection-compression molding machine having a movable platen and a stationary platen. The compressor unit includes a compression pin (32) fixed to the end of a ball screw (29) threadedly engaged with a ball nut (24) which is coupled, by means of a power transmission mechanism (35), to a servomotor (19) attached to the movable platen (3). As the servomotor rotates, the compression pin moves axially together with the ball screw relative to the movable platen to project through the movable platen toward a mold clamped between the platens to cause molten resin filling the mold to be compressed.

4 Claims, 2 Drawing Sheets

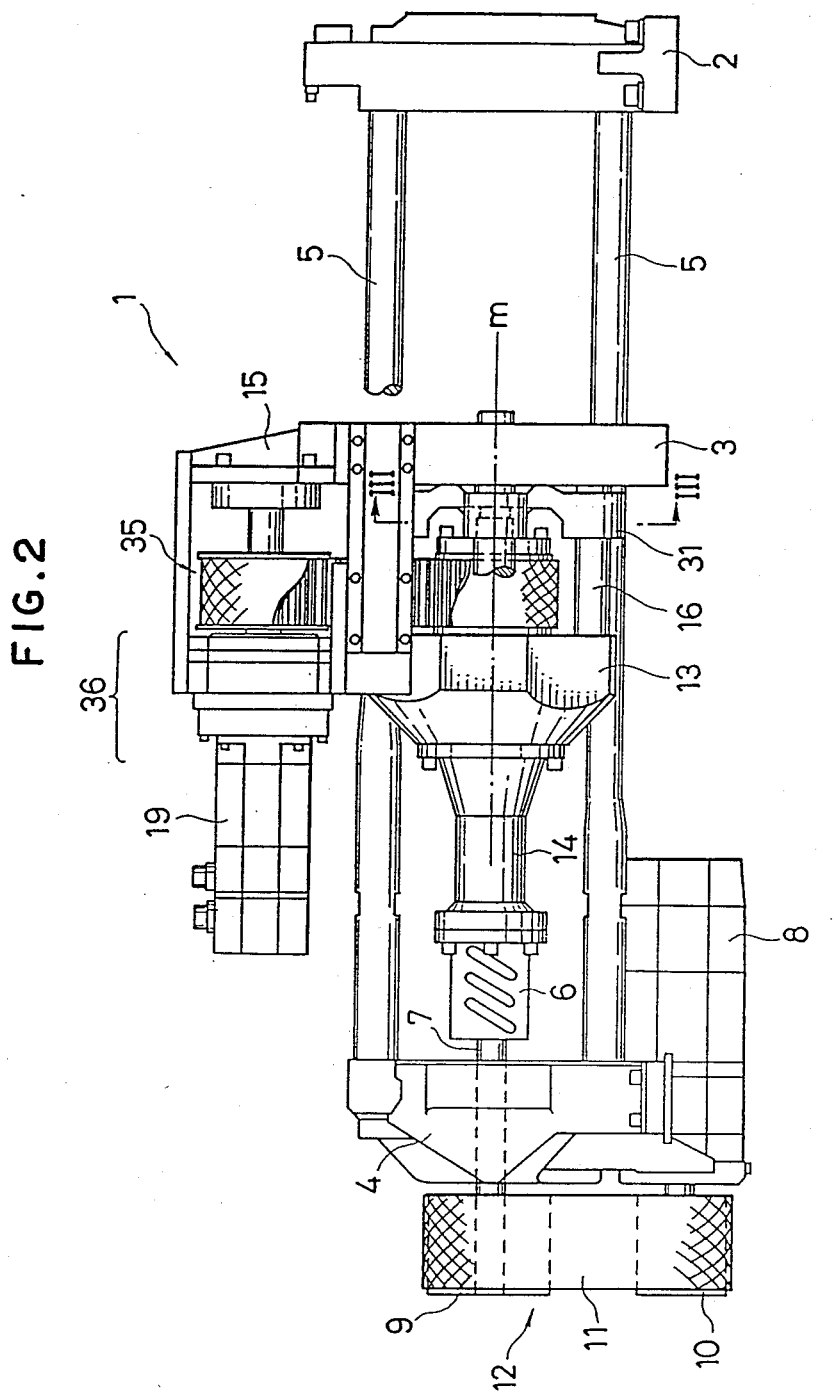

COMPRESSOR UNIT IN AN INJECTION-COMPRESSION MOLDING MACHINE

TECHNICAL FIELD

The present invention relates to an injection-compression molding machine for compressing molten resin injected into molds and molding the resin, and more particularly, to a compressor unit thereof.

BACKGROUND ART

In molding a special resin which lacks fluidity at a normal injection temperature, or in precision molding of products, such as lenses or optical disk substrates, which require dimensional accuracy in microns or higher, injection-compression molding is effected whereby resin injected into molds is compressed, in order to attain improvement in dimensional accuracy and uniformity in material density.

Usually, the injection-compression molding is effected by pushing out a compression pin, at a clamp mechanism section of an injection-molding machine, from a movable platen toward the molds by means of a hydraulic mechanism, thereby thrusting a pressure block toward a cavity of the movable-side mold, at a point in time corresponding to a pressure hold process after the end of the injecting operation. In injection-compression molding of this type, it is essential to control the operation timing, thrusting force, or position of the compression pin. However, in high-accuracy molding, use of a hydraulic compressor unit, as in a conventional arrangement, causes a change of the properties of the hydraulic operating fluid depending on the temperature and the like, thereby changing the follow-up performance and reproducibility of the operation of the compressor unit. Thus, it is difficult to accurately control the compression pin. Since the hydraulic compressor unit is liable to be contaminated by the hydraulic operating fluid, and is under high pressure. Moreover, it must be strictly maintained, and the unit itself is expensive.

DISCLOSURE OF THE INVENTION

The object of the present invention is to provide a compressor unit for an injection-compression molding machine having high control performance, including follow-up performance, reproducibility, etc., and which is capable of high-accuracy molding.

In order to achieve the above object, according to the present invention, there is provided a compressor unit of an injection-compression molding machine in which a pin is projected from a movable platen toward a mold mounted on the platen, thereby compressing molten resin filling the mold. The compressor unit comprises a servomotor disposed on the movable platen, a ball nut operatively coupled to the servomotor for rotation, and a ball screw adapted to be threadedly engaged with the ball nut and movable in an axial direction upon rotation of the ball nut, and which is operatively coupled to the pin.

Thus, in the compressor unit of the present invention, the compression pin is driven by means of the servomotor with the aid of the ball screw and the ball nut, so that variation factors in control related to the compression pin can be eliminated, and high-quality precision moldings can be repeatedly obtained. Moreover, the compressor unit can be relatively easily maintained without soiling its surroundings, and can be constructed at a relatively low cost.

BRIEF DESCRIPTION OF THE DRAWINGS

FIG. 2 is a schematic front view, partially in section, showing a clamp mechanism of an injection-compression molding machine furnished with the compressor unit of FIG. 1.

BEST MODE OF CARRYING OUT THE INVENTION

Figure 1:
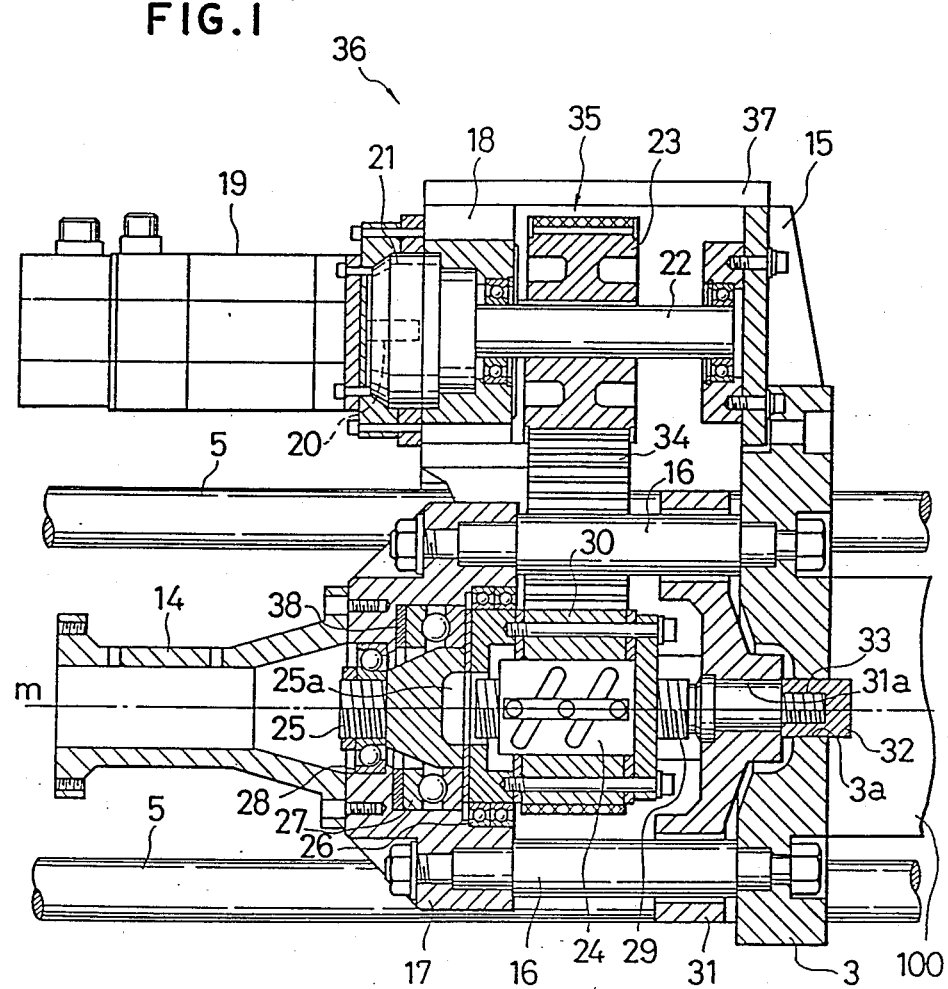
FIG. 1 is a front view, partially in section, showing the principal part of a compressor unit according to one embodiment of the present invention.

A injection-compression molding machine according to one embodiment of the present invention is provided with a direct-acting clamp mechanism 1 shown in FIG. 2. In this clamp mechanism, a movable platen 3 is disposed for reciprocation along four tie bars 5 which connect a stationary platen 2 and a rear platen 4 with each other. Dies (not shown) are mounted individually on the platens 2 and 3.

Rear platen 4 is fitted with a clamping servomotor 8 and a clamping ball screw 7 which, having a clamping ball nut 6 threadedly fitted thereon, extends along a longitudinal axis m of the clamp mechanism 1. The ball screw 7 and the servomotor 8 are coupled to each other by means of a clamping power transmission mechanism 12 which is composed of pulleys 9 and 10 fixed to the rear end portion of the ball screw 7 and the output shaft of the servomotor, respectively, and a timing belt 11 connecting the two pulleys, and which is disposed on the rear end of the rear platen 4.

Figure 3:
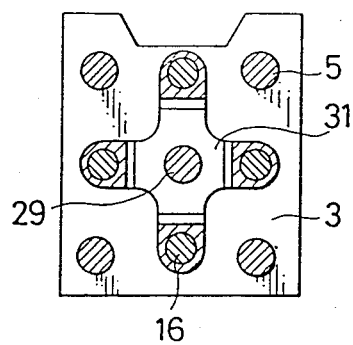
FIG. 3 is a sectional view taken along line III—III of FIG. 2.

A machine frame 13, which is fixed to the movable platen 3 for axial movement therewith and supports a compressor unit 36. The frame includes front and rear support portions 15 and 18 and a housing 17, as shown in FIGS. 1 and 2. The front support portion 15 is attached to one side of the peripheral surface of the movable platen 3 so as to protrude radially outward therefrom. The housing 17 is disposed in alignment with the axis m of the clamp mechanism 1, and is fixed to the rear end face of the movable platen 3 by means of four guide rods (see FIG. 3) 16, so as to be situated parallel to the movable platen 3 and axially spaced therefrom. The rear support portion 18 is mounted on the peripheral surface of housing 17 so as to protrude radially outward from the peripheral surface and face the front support portion 15 at an axial distance therefrom.

A hollow pusher case 14, coaxial with the housing 17, is fixed to the rear end face of the housing, and the clamping ball nut 6 is fixed to the rear end face of the case. That portion of the clamping ball screw 7 on the side of the pusher case 14, with respect to the nut 6, is located inside the case. The rear support portion 18 is fitted with a compression servomotor 19 and a speed reducer 21 is connected to an output shaft 20 thereof. The servomotor 19, in conjunction with various elements mentioned later, constitutes a compressor unit 36. An output shaft 22 of the speed reducer 21 has a pulley 23 on an intermediate portion thereof, and the proximal and distal ends of the output shaft 22 are supported by the rear and front support portions 18 and 15, respectively.

A nut housing 25, which is disposed in a hollow of the housing 17 so as to be coaxial therewith, is rotatably suported on the housing 17 by means of a large-diameter radial bearing 2, a thrust bearing 27, and an angular bearing 28. A pulley 30, having a compression ball nut 24 fitted therein for integral rotation therewith, is fixed to the front end face of the nut housing 25 so as to be in alignment with the pulley 23, with respect to the axial direction. A timing belt 34 is passed around and between the two pulleys 23 and 30. These elements 23, 30 and 34, along with the speed reducer 21, constitute a power transmission mechanism 35 for transmitting the rotary force of the servomotor 19 to the ball nut 24. The compressor unit 36 is made compact by locating the mechanism 35 between the platen 3 and the housing 17.

Further, a compression ball screw 29 is threadedly engaged with the ball nut 24. The ball screw 29 is disposed so that its rear end portion can be removably fitted in a center hole 25a which is formed in the nut housing 25. The front end portion of the ball screw 29 extends to an axial position on the side of the movable platen 3 with respect to the compression ball nut 24, and penetrates an axial hole 31a bored through a supporter 31 which is supported for axial movement by means of the guide rods 16. A compression pin 32 is threadedly fixed on a screw 33 at the tip end of the ball screw 29. The pin 32 can be projected from the movable platen 3 toward a mold (part of which is designated by numeral 100) attached to the movable platen 3, through a through hole 3a formed in the movable platen 3 in alignment with the axis m of the clamp mechanism 1.

In FIG. 1, numeral 37 denotes a coupling bar, which connects the respective upper surfaces of the front and rear support portions 15 and 18, thereby reinforcing both these support portions. A pressure sensor 38 is disposed between the thrust bearing 27 and the housing 17. Further, the injection-compression molding machine is provided with a control section (not shown), e.g., a numerical control unit, constructed in a conventional manner. This control section is operatively connected to the clamp mechanism 1 and the compressor unit 36.

The following is a description of the operation of the aforementioned injection-compression molding machine.

In response to a command from the control section, the clamping servomotor 8 of the clamp mechanism 1 is first rotated before the start of injection and compression processes. Following this, the clamping ball screw 7 is rotated in a predetermined direction by means of the clamping power transmission mechanism 12. As a result, the clamping ball nut 6 moves forward along the axis m, thereby causing the movable platen 3, along with the compressor unit 36 mounted on the machine frame 13 integral with the platen 3, to move forward, through the medium of the pusher case 14. Thus, molds attached individually to the stationary and movable platens 2 and 3 are clamped together. On completion of the mold clamping, the injection process is started, so that the molds are filled with molten resin from an injection nozzle (not shown). When this is finished, the compression process starts, whereupon the compression servomotor 19 is driven so that the compression ball nut 24 is rotated together with housing 17 by means of power transmission mechanism 35. Accordingly, the compression ball screw 29, along with supporter 31, moves forward. Thereupon, the compression pin 32, which is formed integrally with the ball screw 29 through the medium of the screw 33, projects into the movable mold 100, thereby thrusting a pressure block (not shown) in the movable mold into a cavity of the mold. As a result, a necessary pressure is applied to the resin in the mold, so that the resin reaches fine parts of the precision mold, and enjoys a uniform density. During the thrusting operation, the reducer output shaft 22, supported by means of the front and rear support portions 15 and 18, never undergoes bending or the like attributable to the force of action of the power transmission mechanism 35.

During the aforementioned compression process, the compression pin 32 is pressed for a required amount at a pressure and a speed previously set in accordance with the characteristics of the molds and resin, at a suitable point of time after the end of the injection. Control for this operation can be effected easily and accurately by means of the control section and the pressure sensor 38.

Subsequent processes, including processes for cooling, mold opening, etc., are not particularly different from those for injection molding. Therefore, a description of these processes is omitted herein.

We claim:

1. A compressor unit of an injection-compression molding machine wherein said injection-compression molding machine has a movable platen and a stationary platen, said platens clamping a mold filled with molten resin, said unit comprising:

a servomotor attached to said movable platen;
    a ball nut operatively coupled to said servomotor for rotation;
    a ball screw threadedly engaged with said ball nut, said ball screw movable in an axial direction, upon rotation of said ball nut and a pin couple to said ball screw so as to be movable with said ball screw whereby when said ball nut is rotated to move said ball screw forwardly relatively to said moving platen, said pin is moved forwardly through said movable platen to cause said molten resin to be compressed.

2. A compressor unit according to claim 1, further including:

a machine frame fixed to said movable platen; and
    a nut housing connected to said movable platen, so as to be rotatable, said nut housing being axially movable with said moving platen; and
    wherein said servomotor is fixed to said machine frame, and said ball nut is supported by said nut housing for integral rotation with said nut housing.

3. A compressor unit according to claim 2, wherein said machine frame includes first and second support portions spaced from and facing each other, said nut housing is disposed at an axial distance from said movable platen, a first pulley is rotatably supported between said first and second support portions, and is rotated by means of said servomotor, a second pulley is fixed to a forward end of said housing for integral rotation therewith, a belt is stretched between said first and second pulleys, and said ball nut is fitted in said second pulley.

4. A compressor unit according to claim 3, wherein said servomotor has an output shaft which is rotatably supported by means of said first and second support portions.

* * * * *

UNITED STATES PATENT AND TRADEMARK OFFICE
CERTIFICATE OF CORRECTION

PATENT NO. : 4,906,173

DATED : March 6, 1990

INVENTOR(S) : YOSHIHARA INABA et al.

It is certified that error appears in the above-identified patent and that said Letters Patent is hereby corrected as shown below:

Column 2, line 37, delete ", which".

Column 3, line 4, "2" should be --26--.

Signed and Sealed this

Fifth Day of March, 1991

Attest:

HARRY F. MANBECK, JR.

Attesting Officer

Commissioner of Patents and Trademarks